(12) United States Patent
Mequanint et al.

(10) Patent No.: US 11,216,541 B2
(45) Date of Patent: Jan. 4, 2022

(54) USER ADAPTATION FOR BIOMETRIC AUTHENTICATION

(71) Applicant: QUALCOMM Incorporated, San Diego, CA (US)

(72) Inventors: Eyasu Zemene Mequanint, San Diego, CA (US); Shuai Zhang, San Diego, CA (US); Yingyong Qi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 16/125,360

(22) Filed: Sep. 7, 2018

(65) Prior Publication Data

US 2020/0082062 A1 Mar. 12, 2020

(51) Int. Cl.
*G06F 21/32* (2013.01)
*G06F 21/44* (2013.01)

(52) U.S. Cl.
CPC .............. *G06F 21/32* (2013.01); *G06F 21/44* (2013.01)

(58) Field of Classification Search
CPC ..... G06F 21/32; G06F 21/44; G06K 9/00926; G06K 9/22; G06K 9/00288
See application file for complete search history.

(56) References Cited

U.S. PATENT DOCUMENTS

| | | | |
|---|---|---|---|
| 8,229,182 B2 | 7/2012 | Webster | |
| 9,223,955 B2* | 12/2015 | Lymberopoulos | ........................... H04L 63/0861 |
| 9,471,765 B1* | 10/2016 | Setterberg | .......... G06K 9/00026 |
| 9,600,730 B2 | 3/2017 | Paul et al. | |
| 9,654,469 B1* | 5/2017 | Yang | .................. G06K 9/00288 |
| 2003/0195740 A1* | 10/2003 | Tokuda | ................... G10L 15/26 704/1 |
| 2006/0093208 A1* | 5/2006 | Li | ........................ G06K 9/6276 382/159 |
| 2006/0222210 A1* | 10/2006 | Sundaram | ............ G06K 9/6255 382/115 |
| 2007/0038460 A1* | 2/2007 | Navratil | .................. G10L 17/20 704/273 |

(Continued)

FOREIGN PATENT DOCUMENTS

WO 2015039102 A1 3/2015

OTHER PUBLICATIONS

International Search Report and Written Opinion—PCT/US2019/046851—ISA/EPO—dated Nov. 7, 2019.

*Primary Examiner* — Aravind K Moorthy

(57) ABSTRACT

Techniques and systems are provided for authenticating a user of a device. For example, input biometric data associated with a person can be obtained. A similarity score for the input biometric data can be determined by comparing the input biometric data to a set of templates that include reference biometric data associated with the user. The similarity score can be compared to an authentication threshold. The person is authenticated as the user when the similarity score is greater than the authentication threshold. The similarity score can also be compared to a learning threshold that is greater than the authentication threshold. A new template including features of the input biometric data is saved for the user when the similarity score is less than the learning threshold and greater than the authentication threshold.

30 Claims, 9 Drawing Sheets

(56) References Cited

U.S. PATENT DOCUMENTS

| | | | |
|---|---|---|---|
| 2007/0120970 A1* | 5/2007 | Goffin | H04N 21/4415 348/14.16 |
| 2008/0212846 A1* | 9/2008 | Yamamoto | G06F 21/32 382/115 |
| 2008/0270132 A1 | 10/2008 | Navratil et al. | |
| 2008/0317294 A1* | 12/2008 | Hashimoto | G07C 9/37 382/115 |
| 2009/0003663 A1* | 1/2009 | Webster | G06K 9/00885 382/119 |
| 2011/0311110 A1* | 12/2011 | Benini | G06K 9/6202 382/115 |
| 2012/0164978 A1* | 6/2012 | Conti | H04W 12/06 455/411 |
| 2012/0314911 A1* | 12/2012 | Paul | G06K 9/00892 382/115 |
| 2013/0015946 A1* | 1/2013 | Lau | G06F 21/32 340/5.2 |
| 2013/0083975 A1* | 4/2013 | Partington | G06K 9/00973 382/115 |
| 2013/0247175 A1* | 9/2013 | Nechyba | G06F 21/32 726/19 |
| 2013/0283372 A1* | 10/2013 | Tsukamoto | G06F 21/316 726/18 |
| 2013/0340061 A1* | 12/2013 | Tsukamoto | H04L 9/3231 726/7 |
| 2014/0016833 A1* | 1/2014 | Ide | G06K 9/00926 382/115 |
| 2014/0139318 A1* | 5/2014 | Malpani | G06F 21/32 340/5.82 |
| 2015/0078629 A1* | 3/2015 | Gottemukkula | G06K 9/6201 382/117 |
| 2015/0092996 A1 | 4/2015 | Tian | |
| 2015/0347816 A1* | 12/2015 | Boshra | G06K 9/0002 382/124 |
| 2016/0132669 A1* | 5/2016 | Pathangay | G06F 21/32 726/19 |
| 2016/0234023 A1* | 8/2016 | Mozer | H04L 63/0861 |
| 2016/0241552 A1* | 8/2016 | Lindemann | H04L 63/0861 |
| 2017/0041314 A1* | 2/2017 | Shin | H04L 9/085 |
| 2017/0046550 A1* | 2/2017 | Lee | G06K 9/001 |
| 2017/0053108 A1* | 2/2017 | Jakobsson | H04L 63/10 |
| 2017/0132458 A1* | 5/2017 | Short | G06K 9/00255 |
| 2017/0140212 A1* | 5/2017 | Lo | G06K 9/6206 |
| 2017/0193558 A1* | 7/2017 | Lyons | G06Q 30/0269 |
| 2017/0199996 A1 | 7/2017 | Han et al. | |
| 2017/0337419 A1* | 11/2017 | Zhang | G06K 9/00013 |
| 2018/0004924 A1 | 1/2018 | Tieu | |
| 2018/0107865 A1* | 4/2018 | Ahlawat | G06F 16/5838 |
| 2018/0121713 A1* | 5/2018 | Guo | G06T 7/30 |
| 2018/0129861 A1* | 5/2018 | Kim | G06K 9/00026 |
| 2018/0137395 A1* | 5/2018 | Han | G06N 3/04 |
| 2018/0144184 A1* | 5/2018 | Frischholz | G06K 9/00597 |
| 2018/0181834 A1* | 6/2018 | Cui | G06K 9/00255 |
| 2018/0204058 A1* | 7/2018 | Yoo | G06K 9/00617 |
| 2018/0225506 A1* | 8/2018 | Lambert | G06K 9/00926 |
| 2018/0293462 A1* | 10/2018 | Ambati | G06N 5/022 |
| 2018/0293501 A1* | 10/2018 | Ambati | G06N 5/02 |
| 2018/0307815 A1* | 10/2018 | Samadani | H04N 5/23293 |
| 2018/0358113 A1* | 12/2018 | Cronin | G06F 21/32 |
| 2018/0373924 A1* | 12/2018 | Yoo | G06K 9/4628 |
| 2019/0005218 A1* | 1/2019 | Goto | G06K 9/6201 |
| 2019/0034611 A1* | 1/2019 | Bergsell | G06F 21/32 |
| 2019/0042835 A1* | 2/2019 | Mostafa | G06K 9/00288 |
| 2019/0042866 A1* | 2/2019 | Mostafa | G06K 9/2036 |
| 2019/0220922 A1* | 7/2019 | Barkas | G06Q 40/12 |
| 2019/0287026 A1* | 9/2019 | Calmon | H04L 9/3239 |
| 2019/0311099 A1* | 10/2019 | Baldwin | G06N 7/005 |
| 2019/0327092 A1* | 10/2019 | Kareti | H04L 9/0891 |
| 2019/0370443 A1* | 12/2019 | Lesso | G10L 25/51 |
| 2020/0065563 A1* | 2/2020 | Zou | G06K 9/00268 |
| 2020/0242397 A1* | 7/2020 | Ishiyama | G06T 7/00 |

\* cited by examiner

USER ADAPTATION FOR BIOMETRIC AUTHENTICATION

FIELD

The present disclosure generally relates to object authentication, and more specifically to techniques and systems providing user adaptation for biometric authentication.

BACKGROUND

Object authentication and/or verification can be used to authenticate or verify an object. Biometric-based authentication methods exist for authenticating people, and can be used for various purposes, such as providing access to places and/or electronic devices. Examples of biometric-based authentication include face authentication, fingerprint authentication, voice authentication, among others. Face authentication, for example, can compare a face of a device user in an input image with known features of the person the user claims to be, in order to authenticate that the user of the device is, in fact, the person. A similar process can be performed for fingerprint authentication, voice authentication, and other biometric-based authentication methods.

SUMMARY

Systems and techniques are described herein that provide user-adaptive biometric authentication. For example, a person can be authenticated based on one or more templates that are unique to the person. The one or more templates can be referred to as a template set for the person. The templates can be generated during an enrollment step (e.g., during registration) and/or using the user-adaptive techniques described herein. During an authentication step, a similarity can be computed between the one or more templates and input biometric data of a user purporting to be the person. A resulting similarity score can then be used to determine whether the user is the person with a high degree of certainty.

The user-adaptive biometric authentication systems and techniques described herein can adaptively generate new templates, and/or update existing templates, in order to capture a large range of intra-class variations of the input data and without introducing additional vulnerability to impostors. Using a face as an example, large intra-class face variations can be due to the pose of the person, removable accessories and/or features (e.g., beards, mustaches, glasses, scarves, or other items), facial expressions, occlusions, aging, change in facial features, lighting conditions, among others. The templates can be adaptively generated and/or updated using a threshold-based, gradual learning technique. In some cases, the templates can also be generated and/or updated based on passcode entry.

In some implementations, an efficient incremental-decremental learning process is provided to further cover large intra-class variations, while maintaining a memory requirement within a given limit. For example, the incremental-decremental learning process can assign an importance score to each template in the template set. The importance score helps to optimize the enrolled data both during registration and adaptation. One or more templates with lowest importance score(s) in the template set can be removed when memory usage exceeds a given limit.

In one illustrative example, a method of authenticating a user of a device is provided. The method includes obtaining input biometric data associated with a person, and determining a similarity score for the input biometric data. The similarity score can be determined by comparing the input biometric data to one or more templates. The one or more templates include reference biometric data associated with the user. The method further includes comparing the similarity score to an authentication threshold, and authenticating the person as the user when the similarity score is greater than the authentication threshold. The method further includes comparing the similarity score to a learning threshold, where the learning threshold is greater than the authentication threshold. The method further includes saving a new template for the user when the similarity score is less than the learning threshold and greater than the authentication threshold. The new template includes features of the input biometric data.

In another example, an apparatus for authenticating a user is provided that includes a processor and a memory configured to store one or more templates. The processor is configured to and can obtain input biometric data associated with a person, and determine a similarity score for the input biometric data. The similarity score can be determined by comparing the input biometric data to one or more templates. The one or more templates include reference biometric data associated with the user. The processor is further configured to and can compare the similarity score to an authentication threshold, and authenticate the person as the user when the similarity score is greater than the authentication threshold. The processor is further configured to and can compare the similarity score to a learning threshold, where the learning threshold is greater than the authentication threshold. The processor is further configured to and can save a new template for the user when the similarity score is less than the learning threshold and greater than the authentication threshold. The new template includes features of the input biometric data.

In another example, a non-transitory computer-readable medium is provided that has stored thereon instructions that, when executed by one or more processors, cause the one or more processor to: obtain input biometric data associated with a person; determine a similarity score for the input biometric data by comparing the input biometric data to one or more templates, the one or more templates including reference biometric data associated with the user; compare the similarity score to an authentication threshold; authenticate the person as the user when the similarity score is greater than the authentication threshold; compare the similarity score to a learning threshold, the learning threshold being greater than the authentication threshold; and save a new template for the user when the similarity score is less than the learning threshold and greater than the authentication threshold, the new template including features of the input biometric data.

In another example, an apparatus for authenticating a user is provided. The apparatus includes means for obtaining input biometric data associated with a person, and means for determining a similarity score for the input biometric data. The similarity score can be determined by comparing the input biometric data to one or more templates. The one or more templates include reference biometric data associated with the user. The apparatus further includes means for comparing the similarity score to an authentication threshold, and means for authenticating the person as the user when the similarity score is greater than the authentication threshold. The apparatus further includes means for comparing the similarity score to a learning threshold, where the learning threshold is greater than the authentication threshold. The apparatus further includes means for saving a new template for the user when the similarity score is less than the learning threshold and greater than the authentication threshold. The new template includes features of the input biometric data.

In some aspects, the method, apparatuses, and computer-readable medium described above further comprise determining one or more importance scores for the one or more templates. For example, an importance score can be determined for each template. In some cases, an importance score is determined for a template of the one or more templates based on a minimum distance of the template from other templates of the one or more templates. In some cases, an importance score is determined for a template of the one or more templates based on an average of at least two minimum distances of the template from other templates of the one or more templates. In some cases, an importance score is determined for a template of the one or more templates based on a density of the template. The density is associated with an average similarity that the template has with other templates of the one or more templates. In some aspects, the method, apparatuses, and computer-readable medium described above further comprise removing a template with a lowest importance score from storage when memory usage of the device exceeds a usage threshold.

In some aspects, the method, apparatuses, and computer-readable medium described above further comprise: comparing the similarity score to a passcode threshold, the passcode threshold being less than the authentication threshold; requesting a passcode when the similarity score is less than the authentication threshold and greater than the passcode threshold; receiving a passcode; determining whether the received passcode is a correct passcode; and saving a new template for the user when the correct passcode is received.

In some aspects, the method, apparatuses, and computer-readable medium described above further comprise: comparing the similarity score to a passcode threshold, the passcode threshold being less than the authentication threshold; and maintaining the device in a locked state when the similarity score is less than the authentication threshold and less than the passcode threshold.

In some aspects, the method, apparatuses, and computer-readable medium described above further comprise unlocking the device in response to authenticating the person as the user.

In some aspects, the input biometric data includes face data. In some examples, the face data includes one or more feature vectors representing a face of the person. In some aspects, the method, apparatuses, and computer-readable medium described above further comprise: extracting one or more features of the face; and generating the one or more feature vectors representing the face using the extracted one or more features.

In some aspects, the input biometric data includes fingerprint data. In some aspects, the input biometric data includes voice data.

In some aspects, the apparatus comprises a mobile device. In some examples, the apparatus further comprises an input device for obtaining the biometric input data. In some cases, the input device includes at least one or more of a camera, a fingerprint scanner, and a microphone.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
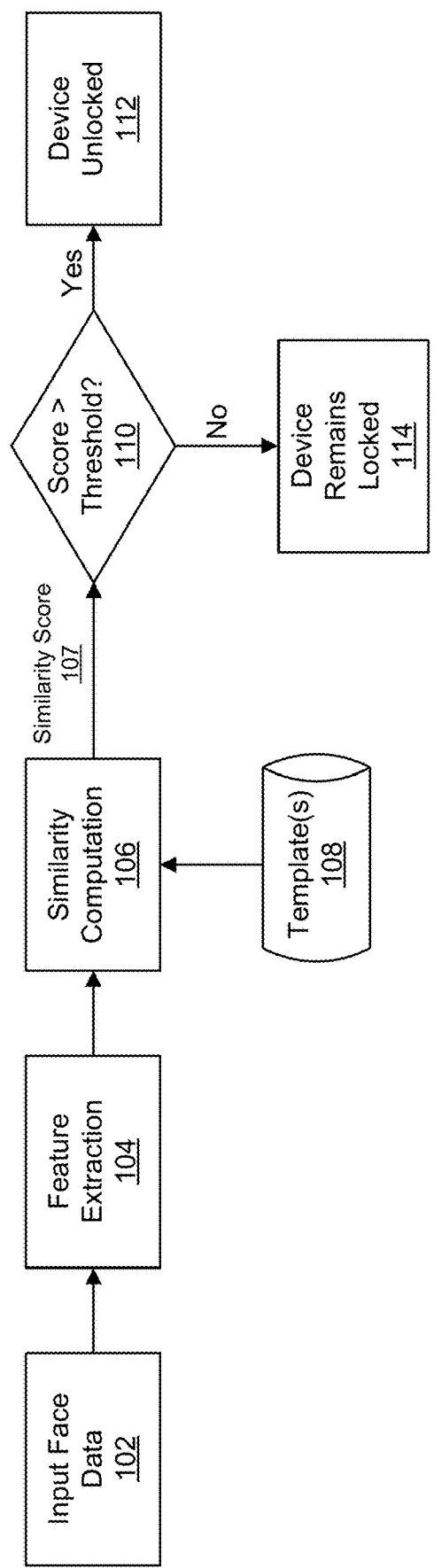
FIG. 1 is a flowchart illustrating an example of a process for performing biometric authentication, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Object identification and object authentication (also referred to as object verification) present two related problems and have subtle differences. Object identification can be defined as a one-to-multiple problem in some cases. For example, face identification (as an example of object identification) can be used to find a person from multiple persons. Face identification has many applications, such as for performing a criminal search. Object authentication can be defined as a one-to-one problem. For example, face authentication (as an example of object authentication) can be used to check if a person is who they claim to be (e.g., to check if the person claimed is the person in an enrolled database of authorized users). Face authentication has many applications, such as for performing access control to a device, system, place, or other accessible item.

Using face identification as an illustrative example of object identification, an enrolled database containing the features of enrolled faces can be used for comparison with the features of one or more given query face images (e.g., from input images or frames). The enrolled faces can include faces registered with the system and stored in the enrolled database, which contains known faces. An enrolled face that is the most similar to a query face image can be determined to be a match with the query face image. Each enrolled face can be associated with a person identifier that identifies the person to whom the face belongs. The person identifier of the matched enrolled face (the most similar face) is identified as the person to be recognized.

As noted above, object authentication or verification systems can be used to authenticate or verify objects. For example, using face authentication as an example, a input query face image can be compared with stored or enrolled representations of a person's face. In general, face authentication needs higher recognition accuracy since it is often related to access control of a device or system. A false positive is not expected in this case. Face authentication should be able to recognize the person who the face belongs to with high accuracy but with low rejection rate. Rejection rate is the percentage of faces that are not recognized due to a matching score or classification result being below a threshold for recognition.

Biometrics is the science of analyzing physical or behavioral characteristics specific to each individual, in order to be able to authenticate the identity of each individual. Biometric-based authentication methods can be used to authenticate people, such as to provide access to devices, systems, places, or other accessible items. In some cases, biometric-based authentication allows a person to be authenticated based on a set of templates (verifiable data), which are unique to the person. Examples of biometric-based authentication include face authentication, fingerprint authentication, voice authentication, among others. Face authentication, for example, can compare a face of a device user in an input image with known features (e.g., stored in one or more templates) of the person the user claims to be, in order to authenticate that the user of the device is, in fact, the person. A similar process can be performed for fingerprint authentication, voice authentication, and other biometric-based authentication methods.

Biometric-based user authentication systems typically have at least two steps, including an enrollment step and an authentication step (or test step). The enrollment step captures biometric data and stores representations of the biometric data as a template. The template can then be used in the authentication step. For example, the authentication step can determine the similarity of the template against a representation of input biometric data, and can use the similarity to determine whether to authenticate the user.

FIG. 1 is a flowchart illustrating an example of a general authentication process using a face as biometric data. Input face data 102 corresponding to a user attempting to access a device is received. The input face data 102 is processed for feature extraction at block 104. For example, at block 104, a feature representation including one or more features of the face can be extracted from an input image containing the face. The feature representation of the face can be compared to a face representation (e.g., stored as a template in a template database 108) of a person authorized to access the device.

At block 106, a similarity can be computed between the feature representation of the user and a feature representation of the face of the person stored in the template database 108. The computed similarity can be used as the similarity score 107 that will be used to make the final authentication decision. For example, at block 110, the similarity score 107 can be compared to a threshold. If the similarity score 107 is greater than the threshold, the device is unlocked at block

112. However, if the similarity score 107 is not greater than the threshold, the device remains locked at block 114.

Several problems exist with biometric-based authentication systems. For instance, when a biometric-based authentication system is set up, the amount of biometric data information that is stored in a template or representation is limited, and the setup conditions can often differ from the test conditions (during the authentication or test step) due to large intra-class variations. Using an image with a face as an example, the biometric sample may be a well-lit image of a face during the enrollment step, whereas the presented test image during the authentication step may be taken in poor lighting conditions. Other factors, such as variations in poses, variations in expressions, the presence or lack of removable accessories and/or features (e.g., beards, mustaches, glasses, scarves, or other items), sensor differences, occlusions, among other factors, can also produce a test image with different levels of quality than that of the biometric data used during enrollment. In addition, faces may change (either temporarily or permanently) over time due to many factors, such as age, environmental conditions, lifestyle, diseases, treatment to diseases, among others. All the above variabilities are major sources of error in face authentication.

Solutions that can be used to mitigate the above-noted problems include domain adaptations and adaptive biometrics. Methods using domain adaptations attempt to solve such problems by re-training the authentication system. The adaptive biometrics approaches attempt to solve the problems by updating the enrolled templates, which can help to incorporate the variations during the test phase into the reference templates. Such a solution can solve the problems without re-enrollment and model re-training. Also, a large number of templates during the enrollment phase may not be needed. Other types of adaptive biometrics approaches include storing multiple templates that try to cover the large intra-class variations and the co-update approaches. Another possible solution is to perform multiple re-enrollments with some fixed interval of time.

However, frequent re-enrollment is not practical due to the expensive and inconvenient nature of requiring such frequent re-enrollments. One alternative is to add to the existing templates only when the similarity score of a presented biometric representation exceeds an authentication threshold, which can be a high threshold to ensure the probability of an impostor being authenticated is low. However, such an approach may not be able to cover all the possible intra-class variations when a high threshold is used. If a more relaxed threshold is used, such an approach can suffer from the introduction of imposters into the templates.

Threshold-based approaches also do not have well-defined criteria for ending a template update process, which includes updating one or more stored templates. For example, considering the trade-off between performance and the size of a template set, the template update process can be disabled after a fixed amount of time or after a fixed size of the template set is attained. However, such techniques are not able to capture all the variations presented after the template update is disabled.

In some cases, a template set can be improved by merging and averaging multiple templates, which can capture gradual changes in the biometric samples. While such an approach helps capture gradual changes and reduces storage and computational requirements, the approach works only for permanent gradual changes. Gradual changes that are not permanent (e.g., the presence or absence of facial hair, accessories such as a scarf, sun glasses, or the like, among other similar variations) are not captured by such an approach.

Systems and methods are described herein that provide efficient user-adaptive biometric authentication. The systems and methods can be used for any biometric-based authentication, including, but not limited to, face authentication, fingerprint authentication, voice authentication, or any other type of biometric-based authentication. For illustrative purposes, examples will be described herein using faces of people as illustrative examples of objects and biometric data representing the objects. In such examples, an image of a face can be used as biometric input data. For instance, one illustrative example of a use case for the user-adaptive biometric authentication techniques described herein is for face authentication for accessing mobile devices. However, one of ordinary skill will appreciate that the techniques described herein can be applied to any other object (other than a face or person) for which biometric data can be obtained. One of ordinary skill will also appreciate that the techniques described herein can be applied using any type of biometric data, such as fingerprint data, voice data, and/or other biometric data.

As noted above, intra-class face variations can come from variations in lighting conditions, variations in poses, the presence or absence of removable accessories and/or features (e.g., beards, mustaches, glasses, scarves, or other items), variations in facial expressions, occlusion, sensor differences, age, environmental conditions, lifestyle, diseases, treatment to diseases, among other factors. The user-adaptive biometric authentication systems and methods described herein can adaptively update user templates (e.g., by generating new templates and/or removing existing templates), and thus can capture a large range of intra-class variations of the input data, without introducing additional vulnerability to impostors. As described in more detail below, the templates can be adaptively updated using a threshold-based, gradual learning technique. In some cases, the templates can also be generated and/or updated based on passcode entry. In some cases, an efficient incremental-decremental learning process can be provided to further cover large intra-class variations, while maintaining a memory requirement within a given limit. For example, as described in more detail below, the incremental-decremental learning process can assign an importance score to each template in the template set. The importance score helps to optimize the enrolled data both during registration and adaptation. One or more templates with the lowest importance score(s) in the template set can be removed when memory usage exceeds a given limit.

Figure 2:
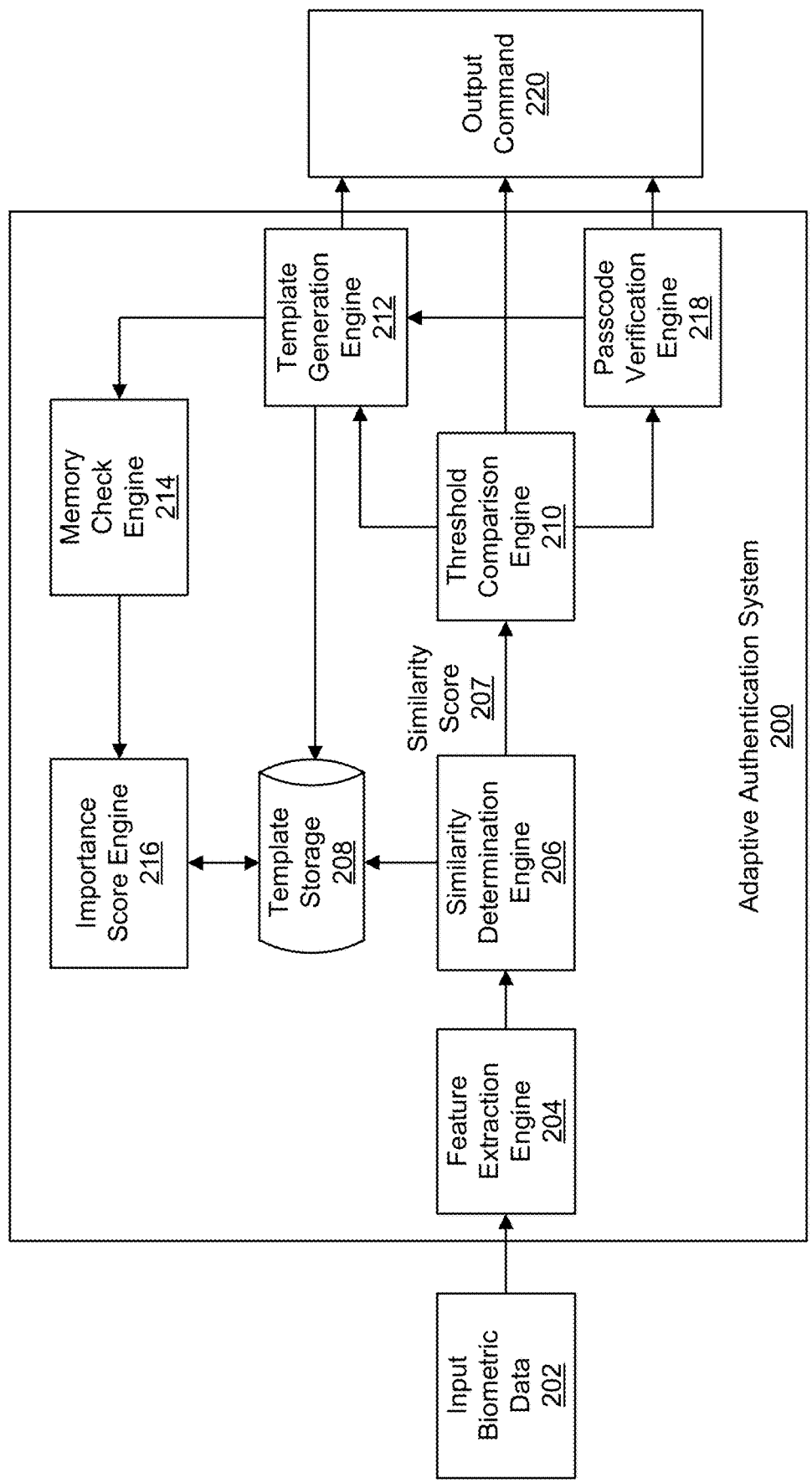
FIG. 2 is a block diagram illustrating a system for performing user-adaptive biometric authentication, in accordance with some examples.

FIG. 2 is a diagram illustrating an example of an adaptive authentication system 200 for performing biometric-based authentication. The adaptive authentication system 200 can be included in a computing device and has various components, including a feature extraction engine 204, a similarity determination engine 206, template storage 208, a threshold comparison engine 210, a template generation engine 212, a memory check engine 214, an importance score engine 216, and a passcode verification engine 218. The components of the authentication system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. While the authentication system 200 is shown to include certain components, one of ordinary skill will appreciate that the authentication system 200 can include more or fewer components than those shown in FIG. 2. For example, the authentication system 200 may also include, in some instances, one or more memory devices (e.g., RAM, ROM, cache, buffer, database, and/or the like) and/or processing devices that are not shown in FIG. 2.

Figure 3:
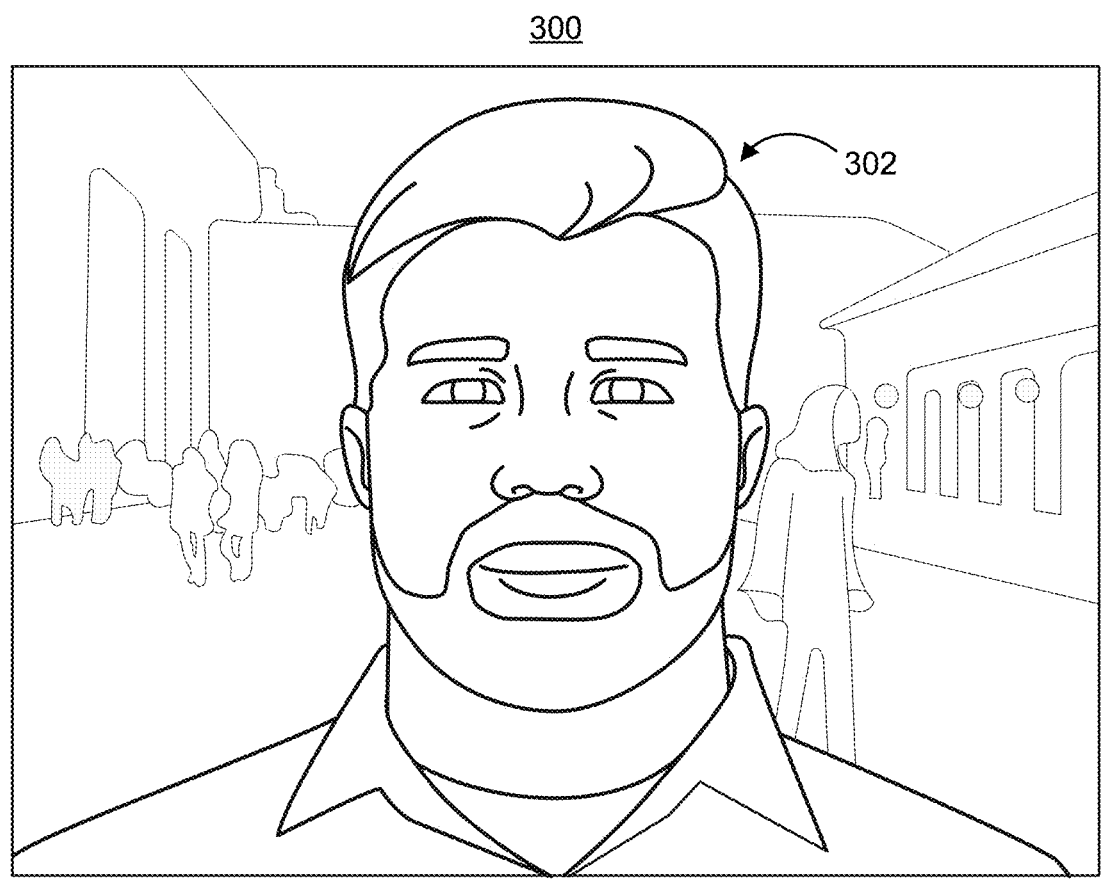
FIG. 3 is a conceptual diagram illustrating an example of an input image with the face of a user to be authenticated, in accordance with some examples.

Operation of the adaptive authentication system 200 will be described with reference to FIG. 4 as an example, which is a flowchart illustrating an example of a process 400 for performing adaptive biometric authentication of a user. For example, the process 400 can be used to authenticate a user providing the input biometric data 402 as a person that is authorized to access the computing device (or a system or place the computing device is associated with). At block 402, the process 400 receives input biometric data. For example, the adaptive authentication system 200 can receive the input biometric data 202 at block 402. The input biometric data 202 can include a biometric input received at runtime when a user is attempting to access or be authenticated by the computing device. Any suitable biometric data can be used as input to the authentication system 200. One illustrative example of biometric data includes an image of a person's face, which can be used as input to perform face authentication for accessing the computing device. FIG. 3 is a conceptual diagram illustrating an example of an input image 300 with the face of a user 302 to be authenticated. Input images can include any suitable type of image, such as a red-green-blue (RGB) image, a luma-chroma blue-chroma red (Y'CbCr) image, a luminance-chroma blue-chroma red (YCbCr) image, a near-infrared (NIR) image, an infrared image, a binary image, and/or any other suitable type of image. While examples are described herein using images of faces as examples of input biometric data, one of ordinary skill will appreciate that the concepts described herein apply to any type of biometric data.

The adaptive authentication system 200 can receive the input biometric data 202 from a biometric data source (not shown). Using images as an example of biometric data, the authentication system 200 can receive the images from an image source (not shown). The images can include still images or video frames. Video frames can also be referred to herein as video pictures or pictures. The images can include a picture of a person's face. The image source from which the images are received can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics images and/or video data, a combination of such sources, or other source of image frame content. In some cases, multiple image sources can provide images to the authentication system 200. In another example using fingerprint data as biometric data, a source of the fingerprint data can include a fingerprint sensor (of the computing device or separate from the computing device), a fingerprint data storage device, or other suitable source. In yet another example using voice data as biometric data, a source of the voice data can include a microphone (of the computing device or separate from the computing device), a voice data storage device, or other suitable source.

The adaptive authentication system 200 can be part of a computing device or multiple computing devices. In some cases, the computing device (or devices) that includes the authentication system 200 can also include one or more wireless transceivers for wireless communications and/or a display for displaying one or more images. In some examples, the computing device that includes the authentication system 200 can be an electronic device, such as a mobile or stationary telephone handset (e.g., smartphone, cellular telephone, or the like), a camera (e.g., a digital camera, an IP camera, a video camera, a camera phone, a video phone, or other suitable capture device), a desktop computer, a laptop or notebook computer, a tablet computer, a set-top box, a television, a display device, a digital media player, a video gaming console, a video streaming device, or any other suitable electronic device. In some cases, the computing device can be single user device (e.g., a personal mobile device, a personal computer, a personal tablet computer, or other type of device). In some cases, the computing device can be a multi-user device (e.g., a computer that multiple users can access, a television, a set-top box, or other type of device that can be accessed by multiple users). For example, multiple users may be able to access a multi-user device using different accounts.

In some implementations, the adaptive authentication system 200 and the biometric data sources described above can be part of the same computing device. For example, in some cases, a phone, camera, tablet, laptop computer, and/or other device with a biometric data source (e.g., a camera, image storage, a fingerprint sensor, fingerprint data storage, a microphone, voice data storage, or the like) can include an integrated authentication system 200. In some implementations, the authentication system 200 and the biometric data source can be part of separate computing devices. In one illustrative example, an image source can be one or more cameras, and the computing device with the authentication system 200 can be a mobile or stationary telephone handset, a desktop computer, a laptop or notebook computer, a tablet computer, or other computing device.

The templates in the template storage 208 can be generated during an enrollment step, when a person is registering their biometric features for later use during authentication. Each template can be linked internally (e.g., in the template storage 208) to a subject identifier (ID) that is unique to the person being registered. For example, during enrollment (which can also be referred to as registration), an owner of the computing device and/or other user with access to the computing device can input one or more biometric data samples (e.g., an image, a fingerprint sample, a voice sample, or other biometric data), and representative features of the biometric data can be extracted by the feature extraction engine 204. The representative features of the biometric data can be stored as one or more templates in the template storage 208. Using images as an example of biometric data, several images can be captured of the owner or user with different poses, positions, facial expressions, lighting conditions, and/or other characteristics. Facial features of the different images can be extracted and saved as templates. For instance, a template can be stored for each image, with each template representing the features of each face with its unique pose, position, facial expression, lighting condition, etc. The one or more templates stored in the template storage 208 can be used as a reference point for performing authentication. While the template storage 208 is shown as being part of the same device as the authentication system 200, the template storage can be located remotely (e.g., at a remote server that is in communication with the authentication system 200) in some cases.

The feature extraction engine 204 also extracts features from the input biometric data 202. For example, at block 404 of FIG. 4, the process 400 can perform feature extraction to extract features from the input biometric data 202. Any suitable feature extraction technique can be used by the feature extraction engine 204 to extract features from the biometric data (during registration and during the authentication). Various examples of feature extraction techniques that can be used by the feature extraction engine 204 are described in Wang, et al., "Face Feature Extraction: A Complete Review," IEEE Access, Volume 6, 2018, Pages 6001-6039, which is hereby incorporated by reference in its entirety and for all purposes. For example, some types of feature extraction techniques can generate handcrafted features and other types of feature extraction techniques can generate deep learning features. One illustrative example of a feature extraction process performed by the feature extraction engine 204 that can generate deep learning features is neural network (e.g., a deep learning network) based feature extraction. For example, a neural network can be applied to an input image including a face of a person, and can learn the distinctive features of the face. The neural network can be a classification network including hidden convolutional layers that apply kernels (also referred to as filters) to the input image to extract features. A more detailed discussion of neural networks is described below with respect to FIG. 8 and FIG. 9.

One illustrative example of a feature extraction process performed by the feature extraction engine 204 that can generate handcrafted features is a steerable filter-based feature extraction process. Other examples of feature extraction techniques for generating handcrafted features include a learning-based encoder, a discriminant face descriptor (DFD)-based feature extractor, among others. A steerable filter-based feature extraction process can operate to synthesize filters using a set of basis filters. For instance, the process can provide an efficient architecture to synthesize filters of arbitrary orientations using linear combinations of basis filters. Such a process provides the ability to adaptively steer a filter to any orientation, and to determine analytically the filter output as a function of orientation. In one illustrative example, a two-dimensional (2D) simplified circular symmetric Gaussian filter can be represented as:

$$G(x,y) = e^{-(x^2+y^2)},$$

where x and y are Cartesian coordinates, which can represent any point, such as a pixel of an image or video frame. The n-th derivative of the Gaussian is denoted as $G_n$, and the notation $(\ldots)^\theta$ represents the rotation operator. For example, $f^\theta(x,y)$ is the function $f(x,y)$ rotated through an angle $\theta$ about the origin. The x derivative of $G(x,y)$ is:

$$G_1^{0°} = \frac{\partial}{\partial x} G(x,y) = -2xe^{-(x^2+y^2)},$$

and the same function rotated 90° is determined as the y derivative of $G(x,y)$:

$$G_1^{90°} = \frac{\partial}{\partial y} G(x,y) = -2ye^{-(x^2+y^2)},$$

where $$\frac{\partial}{\partial x} \text{ and } \frac{\partial}{\partial y}$$

are the derivative symbols, and where $G_1^{0°}$ and $G_1^{90°}$ are called basis filters since $G_1^\theta$ can be represented as $G_1^\theta = \cos(\theta)G_1^{0°} + \sin(\theta)G_1^{90°}$ and $\theta$ is an arbitrary angle, indicating that $G_1^{0°}$ and $G_1^{90°}$ span the set of $G_1^\theta$ filters (hence, basis filters). Therefore, $G_1^{0°}$ and $G_1^{90°}$ can be used to synthesize filters with any angle. The $\cos(\theta)$ and $\sin(\theta)$ terms are the corresponding interpolation functions for the basis filters.

Steerable filters can be convolved with images to produce orientation maps which in turn can be used to generate representations of features (e.g., represented by feature vectors) of the objects in the images, such as faces. For instance, because convolution is a linear operation, the feature extraction engine 204 can synthesize an image filtered at an arbitrary orientation by taking linear combinations of the images filtered with the basis filters $G_1^{0°}$ and $G_1^{90°}$. In some cases, the features can be from local patches around selected locations on detected faces (or other objects or biometric features). Steerable features from multiple scales and orientations can be concatenated to form an augmented feature vector that represents a face image (or other biometric data). In one illustrative example, the orientation maps from $G_1^{0°}$ and $G_1^{90°}$ can be combined to get one set of local features, and the orientation maps from $G_1^{45°}$ and $G_1^{135°}$ can be combined to get another set of local features. In some cases, the feature extraction engine 204 can apply one or more low pass filters to the orientation maps, and can use energy, difference, and/or contrast between orientation maps to obtain a local patch. A local patch can be a pixel level element. For example, an output of the orientation map processing can include a texture template or local feature map of the local patch of the face being processed. The resulting local feature maps can be concatenated to form a feature vector for the face image. Further details of using steerable filters for feature extraction are described in William T. Freeman and Edward H. Adelson, "The design and use of steerable filters," IEEE Transactions on Pattern Analysis and Machine Intelligence, 13(9): 891-906, 1991, and in Mathews Jacob and Michael Unser, "Design of Steerable Filters for Feature Detection Using Canny-Like Criteria," IEEE Transactions on Pattern Analysis and Machine Intelligence, 26(8):1007-1019, 2004, which are hereby incorporated by reference, in their entirety and for all purposes.

In some implementations, post-processing (e.g., Linear Discriminant Analysis, Principal Component Analysis (PCA), a combination thereof, and/or other suitable post-processing) can be performed on the feature maps to reduce the dimensionality of the feature size. In order to compensate for possible errors in landmark detection, a multiple scale feature extraction can be used to make the features more robust for matching and/or classification.

A representation of the features extracted from the input biometric data 202 can be compared to the one or more templates stored in the template storage 208 by the similarity determination engine 206. For example, at block 406, the process 400 can perform a similarity computation to compute the similarity between the input biometric data 202 and the one or more templates in the template storage 208. The input biometric data 202 can also be referred to as query data (e.g., a query face when face images are used as biometric data), and the templates can also be referred to as enrolled data (e.g., an enrolled face when face images are used as biometric data). As noted above, in some examples, the features extracted for a face (or other object or biometric feature) can be represented using a feature vector that represents the face (or other object or biometric feature). For instance, each template can be a feature vector, and the representation of the features extracted from the input biometric data can also be a feature vector. Each feature vector can include a number of values representing the extracted features. The values of a feature vector can include any suitable values. In some cases, the values of a feature vector can be floating numbers between −1 and 1, which are normalized feature vector values. The feature vector representing the input biometric data 202 can be compared or matched with the one or more feature vectors of the one or more templates to determine a similarity between the feature vectors. For example, a similarity can be determined between the feature vector representing the input biometric data 202 and the feature vector of each template, resulting in multiple similarity values.

In some implementations, a similarity between features of an enrolled face of a template (from the template storage 208) and features of a query face (of the input biometric data 202) can be measured with distance. Any suitable distance can be used, including Cosine distance, Euclidean distance, Manhattan distance, Mahalanobis distance, absolute difference, Hadamard product, polynomial maps, element-wise multiplication, and/or other suitable distance. In one illustrative example, a similarity between two faces can be computed as the sum of similarities of the two face patches. In some cases, the sum of similarities can be based on a Sum of Absolute Differences (SAD) between the query face (of the input biometric data 202) and an enrolled face of a template (from the template storage 208).

One method to represent similarity is to use similarity scores (also referred to as matching scores). A similarity score represents the similarity between features (indicating how well the features match), where a higher score between two feature vectors indicates that the two feature vectors are more similar than a lower score between two feature vectors. Referring to FIG. 2, the output from the similarity determination engine 206 can include a similarity score 207, indicating a similarity between the features of one or more of the stored templates and the features extracted from the input biometric data 202. The threshold comparison engine 210 can compare the similarity score 207 to one or more thresholds, as described further below. In some cases, a similarity score can be determined between the query face (of the input biometric data 202) and each enrolled face (corresponding to each template), and the highest similarity score (corresponding to the best match) can be used as the similarity score 207 (or the similarity score 407).

In some examples, a similarity score can be generated based on a computed distance between input biometric data 202 and template data, or based on any other comparison metric. As previously described, a distance can include a Cosine distance, Euclidean distance, Manhattan distance, Mahalanobis distance, absolute difference, Hadamard product, polynomial maps, element-wise multiplication, and/or other suitable distance. As noted above, a feature vector for a face (or other object or biometric feature) can be generated based on the feature extraction performed by the feature extraction engine 204. A similarity score between the input biometric data 202 and the template data can be computed based on a distance between a feature vector representing the input biometric data 202 and a feature vector representing the template data. The computed distance represents the difference between data values of the feature vector representing the input biometric data 202 and data values of the feature vector representing the template data. For instance, a cosine distance measures the cosine of the angle between two non-zero vectors of an inner product space, and represents a measure of similarity between the two non-zero vectors. In one illustrative example using cosine as a distance metric, a cosine similarity can be computed as:

$$\text{Cosine Similarity} = \frac{\sum_{i=1}^{n} x_i y_i}{\sqrt{\sum_{i=1}^{n} x_i^2} \sqrt{\sum_{i=1}^{n} y_i^2}},$$

where x and y are components of vector x and y, respectively. The resulting cosine similarity ranges from −1 (indicating the vector values are opposites) to 1 (indicating the vector values are the same). A 0 similarity value indicates orthogonality or decorrelation, while similarity values between −1 and 1 (other than 0) indicate intermediate similarity or dissimilarity. The corresponding cosine distance is then defined as:

Cosine Distance=1−Cosine Similarity.

In some cases, a computed distance (e.g., Cosine distance, Euclidean distance, and/or other distance) can be normalized to a value of 0 or a value of 1. As one example, the similarity score can be defined as 1000*(1−distance). In some cases, the similarity score can be a value between 0 and 1.

The adaptive authentication system 200 performs authentication using a threshold-based, gradual learning technique. For example, similarity scores generated during authentication soon after enrollment may generally be high (e.g., close to the maximum, such as a value of 0.95, 0.98, 1.0, or the like, using a value of 1.0 as the maximum) for the user. As time passes, the similarity score may degrade for the user, due to some gradual changes based on intra-class variations of the input data (e.g., lighting conditions, changes in a person's face, the presence or lack of accessories or features, among others). To account for such degradation, multiple thresholds can be used to allow for gradual learning. For example, an authentication threshold and a gradual learning threshold can be stored, and can be used by the threshold comparison engine 210 for comparison against the similarity score 207. The gradual learning threshold is set to a higher value than the authentication threshold, so that a similarity score that falls between the authentication threshold and the gradual learning threshold can trigger the generation of a new template by the template generation engine 212, which will be saved to the template storage 208. Using faces as an example, the template generation engine 212 can update the template set in the template storage 208 with templates (e.g., feature vectors) representing faces whose similarity scores fall between the gradual learning threshold and the authentication threshold. If the similarity score is above the gradual learning threshold, the face has not changed enough and/or a new feature present on or around the face is not strong enough to lower the similarity score to a point that the authentication system 200 will update with a new template corresponding to the input biometric data 202.

In some cases, the adaptive authentication system 200 can also use a passcode-based update mechanism to perform authentication. While a passcode-based update mechanism is described herein as an example, any other suitable update mechanism can be used, such as a fingerprint-based update, a voice-based update, or other suitable triggering mechanism for updating templates for a user. For the passcode-based update mechanism, a passcode threshold can also be stored and used by the threshold comparison engine 210 for comparison against the similarity score 207. The passcode threshold is set to a lower value than the authentication threshold and the gradual learning threshold, so that a similarity score that is less than the authentication threshold and the gradual learning threshold, but greater than the passcode threshold, can trigger a request for a passcode to be entered using the computing device. The entry of a correct passcode (as confirmed by the passcode verification engine 218) can trigger the generation of a new template by the template generation engine 212. The new template can then be saved to the template storage 208. Generating a new template in such a situation can be beneficial because the similarity score is high enough (greater than the passcode threshold) to indicate that the user may be the person authorized to access the device, but the face may have different facial characteristics than that which is captured in the existing templates, which causes the similarity score 207 to be lower than the authentication threshold but higher than the passcode threshold. For instance, the user may have a different facial feature that is not captured in an existing template, may be wearing an accessory that is not captured in an existing template, may not be wearing an accessory that was captured in the existing templates, and/or may have some other characteristic that causes the similarity score 207 to be lower than the authentication threshold. The correct entry of the passcode can verify that the user is most likely the person, and a new template can be generated and stored in order to capture the different facial characteristic.

In the event the similarity score 207 is less than the passcode threshold, the computing device remains locked (e.g., by outputting an output command 220 to remain locked, or by taking no action). The passcode-based update mechanism helps to reduce the introduction of imposters because faces, for example, with a lower similarity score (but still higher than the passcode threshold) are adapted if and only if the user who tries to unlock the computing device knows the passcode. In some cases, using the passcode-based update alone may not be an effective approach, as a template may be stored for a user of similar appearance to the enrolled person in such situations, which can cause the phone to unlock for more than one person. In some cases, the passcode-based update mechanism described herein may not be used by the adaptive authentication system 200. In some cases, the passcode-based update mechanism can be used without also using the gradual learning technique described above.

Figure 4:
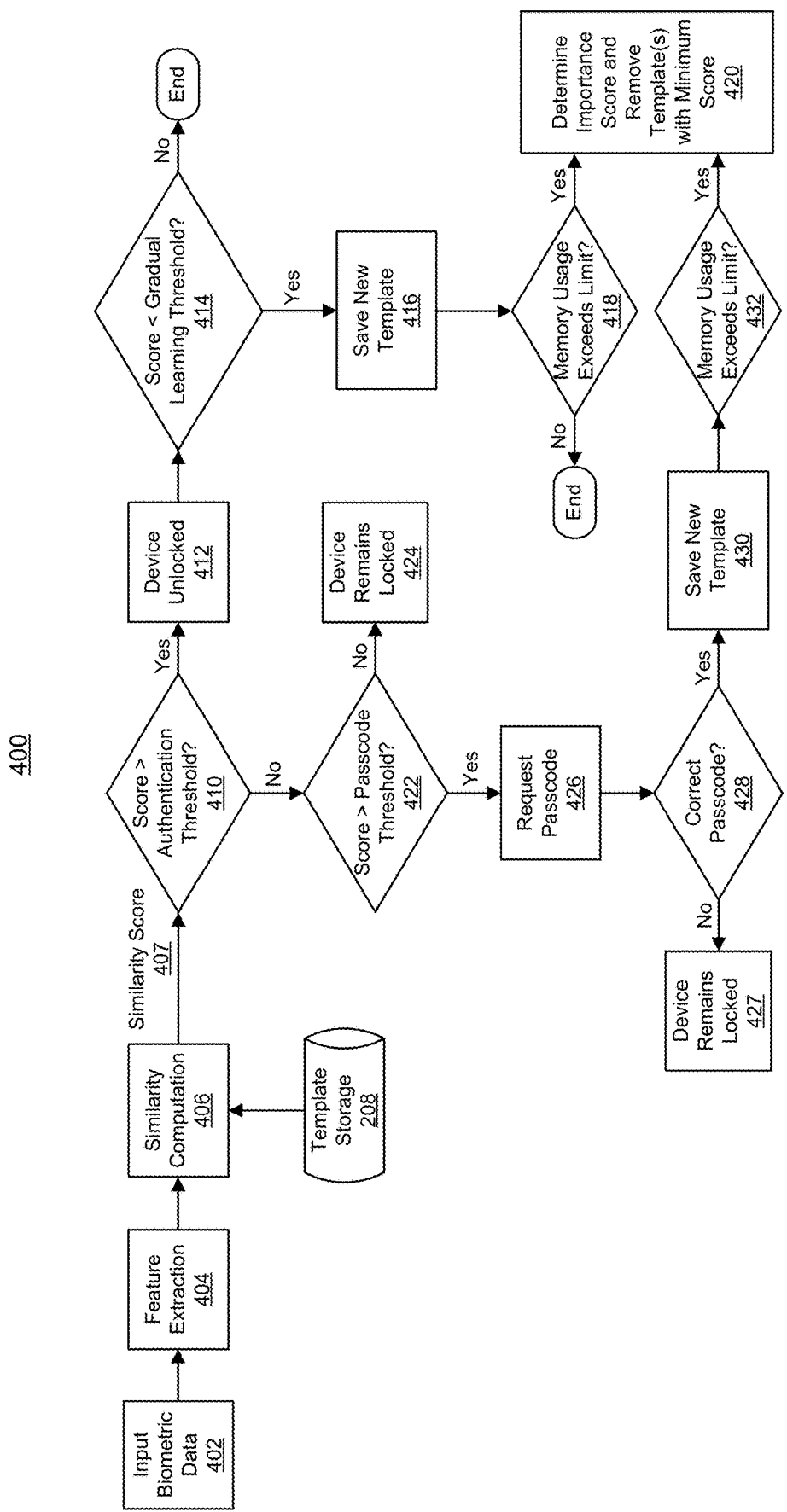
FIG. 4 is a flowchart illustrating an example of a process for performing user-adaptive biometric authentication, in accordance with some examples.

Referring to FIG. 4, as noted above, the process 400 extracts (at block 404) a query face (e.g., a feature vector corresponding to the input biometric data 202) and compares (at block 406) the query face against the enrolled faces (e.g., feature vectors of the reference templates) to generate a similarity score 407. Three different thresholds are used by the adaptive authentication system 200 when performing the process 400, including the authentication threshold, the gradual learning threshold, and the passcode threshold. As described above, the gradual learning threshold is set to a higher value than the authentication threshold, and the passcode threshold is set to a lower value than the authentication threshold. In one illustrative example, the gradual learning threshold can be set to a value of 0.95 (with the maximum similarity score being 1.0 in such an example), the authentication threshold can be set to a value of 0.90, and the passcode threshold can be set to a value of 0.80.

At block 410, the process 400 compares the similarity score 407 to the authentication threshold. Block 410 can be performed by the threshold comparison engine 210. If the similarity score 407 is greater than the authentication threshold, the computing device will be unlocked at block 412. For example, the adaptive authentication system 200 can provide an output command 220 to unlock the computing device. At block 414, the process 400 can then check (e.g., using the threshold comparison engine 210) if the similarity score 407 is less than the gradual learning threshold. If the similarity score 407 is not less than the gradual learning threshold (e.g., if it is greater than or equal to the gradual learning threshold), the process 400 ends. If the similarity score 407 is less than the gradual learning threshold (as determined at block 414) and is greater than the authentication threshold (as determined at block 410), a new template representing the input biometric data 202 (e.g., representing the face in an input image) is generated by the template generation engine 212, and is saved as a template in the template storage 208 at block 416. The template can be generated by associating the feature vector generated from the input biometric data 202 with the subject ID assigned to the person the user was authenticated as.

If the similarity score 407 is determined at block 410 to be less than the authentication threshold, the process 400 checks if the similarity score 407 is greater than the passcode threshold at block 422. If the similarity score is not greater than (e.g., is less than or equal to) the passcode threshold, the computing device remains locked at block 424. If the score is greater than the passcode threshold, the authentication system 200 requests a passcode from the user at block 426. For example, a notification requesting a passcode can be generated and displayed (or otherwise provided) to the user. In another example, a passcode screen can be presented on a display of the computing device, requesting the user to enter a passcode. At block 428, the process 400 determines (e.g., using the passcode verification engine 218) whether a passcode input to the computing device is a correct passcode. If the passcode is verified as a correct passcode, a new template representing the input biometric data 202 (e.g., representing the face in an input image) is generated by the template generation engine 212, and is saved as a template in the template storage 208 at block 430. If the entered passcode is determined not to be correct, the computing device remains locked at block 427.

In some cases, the adaptive authentication system 200 can also perform an incremental-decremental learning process. The incremental-decremental learning process can be provided to control the memory size of the template set, which can maintain a memory requiring within a given limit. The incremental-decremental learning process can also cover large intra-class variations of a face or other biometric feature. The incremental-decremental learning process assigns an importance score to each template in the template set. An importance score computed for a template indicates the importance of that template as compared to all the other templates in the template set. The importance score helps to optimize the enrolled data both during registration and during adaptation when new templates are generated (e.g., when the similarity score is below the gradual learning threshold and/or when a passcode is entered correctly). One or more templates with the lowest importance scores in the template set can be removed when memory usage exceeds a given limit (e.g., a certain number of templates, a percentage or amount of the storage capacity of the template storage 208 or other memory, or some other limit on memory capacity).

The importance score engine 216 can determine or compute an importance score for each template in the template set stored in the template storage 208. In some cases, the importance scores are determined only when a memory of the computing device exceeds the given limit, as determined by the memory check engine 214. In some cases, the importance scores can be determined when a memory of the computing device is within a threshold of the given limit (e.g., within a certain number of bytes from the memory limit). In some cases, the importance scores can be determined independently of memory usage of the computing device. Various techniques for computing importance scores for the templates are provided herein for illustrative purposes.

A first example of an importance score computation approach assigns the minimum distance a template has with other templates in the template set as the importance score for that template. For example, $D_{i,j}$ can denote the distance between the $i^{th}$ and $j^{th}$ templates, and N can denote the number of templates in the template set. Using such notation, the importance score of the $i^{th}$ template (denoted as $I\_S^i$) is computed as follows:

$$I\_S^i = \min_{j \in \{1 \ldots N\}, j \neq i} D_{i,j} \qquad \text{Equation (1)}$$

Using the equation (1) for a first template, a different distance is computed between the first template and all the other templates in the template set. For example, as described above, the templates can each include a feature vector representation, in which case the distance between two feature vector representations can be computed using any suitable distance metric. In such an example, the distance can indicate the difference between the values in the two feature vectors. Any suitable distance metric can be used, such as a Euclidean distance, Cosine distance, Manhattan distance, Mahalanobis distance, absolute difference, Hadamard product, polynomial maps, element-wise multiplication, or other suitable distance. For example, the Euclidean distance can be denoted as:

$$d(p,q) = \sqrt{(q_1-p_1)^2+(q_2-p_2)^2+\ldots+(q_n-p_n)^2} = \sqrt{\Sigma_{i=1}^n (q_i-p_i)^2}, \qquad \text{Equation (2)}$$

where p and q are vectors in n-dimensional space, and where $q_1, q_2 \ldots q_n$ (also denoted as $q_i$ (with $i=1 \ldots n$)) and $p_1, p_2 \ldots p_n$ (also denoted as $p_i$ (with $i=1 \ldots n$)) are points (or values) of the vectors p and q.

Equation (1) further determines the minimum distance (using the min function) the first template has relative to the other templates, and that minimum distance is considered the importance score for the first template. The same computation can be performed for each of the other templates in the template set, resulting in an importance score for each template.

According to a second example of an importance score computation approach, two distances of a template from two neighboring templates are used to compute the importance score. Here, the importance score for the $i^{th}$ template ($I\_S^i$) is computed as follows:

$$I\_S^i = \tfrac{1}{2}(\min_{j \in \{1 \ldots N\}, j \neq i} D_{i,j} + \min_{k \in \{1 \ldots N\}, k \neq \{i,j\}} D_{i,k}). \qquad \text{Equation (3)}$$

Equation (3) takes into account the two minimum distances computed for a template, and averages the two distances. In one illustrative example, if there are five templates in the template set, the distances between a first template and each of the other four templates can be determined using any suitable distance metric, as described above. For instance, the distance between the first template and a second template can be 10, the distance between the first template and a third template can be 20, the distance between the first template and a fourth template can be 30, and the distance between the first template and a fifth template can be 40. In the first approach described above, the value of 10 (the minimum distance) would be used as the importance score. The second approach considers a second minimum distance for each template, which is 20 in the example above. The minimum distance (e.g., 10 in the example above) and the second minimum distance (e.g., 20 in the example above) can be added together, and then divided by two to obtain the average of the two minimum distances.

As indicated above, the first approach assigns an equal importance score for a uniformly distributed template set, while the second approach will assign different scores for a template set even if the template set has a uniform distribution. Templates with values that are around the border in the template feature vector space get higher scores than templates with values that fall into the inner part of the feature vector space. For instance, the feature vector space for a feature vector (corresponding to a template) can include a plurality of points plotted on a graph. In one illustrative example, the points of the two-dimensional space of multiple feature vectors can include endpoint values of (0, 0) and (4, 4), and the values between the endpoints can includes values of (1, 1), (2, 2), and (3, 3). In such an example, the endpoint values of (0, 0) and (4, 4) are the border points. Templates with values that are on the border tend to have high importance scores using the first approach because when the distances are computed, the border templates will have a higher distance from other templates than the templates with values between the border points.

A third example of an importance score computation approach computes an importance score based on density estimation, using the following equation.

$$I\_S^i = \|1-2d_i\|, \qquad \text{Equation (4)}$$

where $d_i$ is the density of the $i^{th}$ template and $\|*\|$ is the norm operator, which can be denoted as:

$$\|x\| = \sqrt{x_1^2+\ldots+x_n^2}. \qquad \text{Equation (5)}$$

In the third approach, $d_i$ is computed as the average similarity that the $i^{th}$ template has with its N neighbor templates in the template set, as follows:

$$d_i = 1/N \sum_j^N e^{-\frac{D_{ij}}{sigma^2}}, \qquad \text{Equation (6)}$$

where sigma is a parameter that can be fixed (e.g., at a value of 1, 2, 3, or other suitable value). In one illustrative example, the average distance among all the templates can be used as the value of sigma. The density equation $d_i$ includes a Gaussian function, which can represent the probability density function.

The first approach above computes the importance score for a given template using a distance from one neighboring template, and the second approach above computes an importance score for a given template using two distances from two neighboring templates. The third approach (using equation (4)) computes the importance score by considering distances from a given template to all other templates (denoted as N templates). According to equations (4) and (6) above, the templates having points with higher densities get lower importance scores (according to the $\|1-2d_i\|$ calculation), penalizing points that are more redundant in the templates. Also, the points in the template feature space around the border will lead to higher importance scores based on lower densities around the border points.

Referring to FIG. 4, once a new template is generated and/or saved, the process 400 determines (e.g., using the memory check engine 214) whether the memory usage exceeds a limit. For example, once a new template is saved at block 416 based on gradual learning, the process determines whether the memory usage exceeds the limit at block 418. As another example, once a new template is saved at block 430 based on a correctly entered passcode, the process determines whether the memory usage exceeds the limit at block 432. The memory limit can be set to any suitable value, such as a percentage or amount (e.g., 80%, 85%, 90%, or other percentage or amount) of the storage capacity of the template storage 208 or other memory, or as a certain number of templates (e.g., 5, 10, 16, 20, 30, or other suitable number of templates).

If the storage limit is determined to be exceeded at block 418 or block 432, the process 400 determines at block 420 (e.g., using the importance score engine 216) the importance scores of the templates in the template set stored in the template storage 208, and removes one or more templates that have the lowest importance scores. For example, the template with the minimum importance score out of the templates can be removed from the template storage 208. In some cases, the new templates can be generated at block 416 and 430 but not stored (instead of being generated and saved), in which case the blocks 418, 432, and 420 can be performed after the templates are generated and before the templates are stored in the memory. In such cases, once the one or more templates with the minimum scores are removed, the new template can be stored in the template storage 208.

Figure 5:
FIG. 5 is a set of pictures illustrating examples of facial variations for a person, in accordance with some examples.

Performance of the above-described systems and methods has been tested with different experiments. Some of the experiments used faces with synthetically-generated components, such as different beards and mustaches (e.g., facial hair), and occlusions that simulate a scarf, hat, and other background changes. FIG. 5 is a set of pictures illustrating examples of facial variations for a person. The first (top) row shows gradual beard growth. The second row (second from the top) shows different scarves placed on different locations of the face and a possible change in the background. The third row (from the top) shows possible background and facial hair variations. The fourth row (from the top) shows different poses along with possible background variations.

In the first part of the experiment with a total of 544 samples, three different strategies were compared, including: (1) Model-1: adapting the reference template set using the process 400 shown on FIG. 4; (2) Model-2: adapting the reference template set using Model-1 but without the gradual learning threshold-based update (excluding blocks 414, 416, and 418) in the process 400 shown on FIG. 4); and (3) No-Update (using no adaptation).

The experiments were also conducted using two different updating strategies, including: (1) Update-1: the most similar template to the new template is replaced; and (2) Update-2: add the new template to the reference template set, compute the importance-score, and remove the template with the lowest importance score. For example, experiments using Model-1 were conducted using Update-1 and also using Update-2. Experiments using Model-2 were also conducted using Update-1 and Update-2.

Results of the experiments are shown in Table 1 below, which provides experimental results showing the effect that the type of adaptation model (Mode-1, Model-2, or No-update), the update strategy (Update-1 or Update-2), and the template size ("T-size") has on false negatives (FN), the number of passcode requests ("Passcode"), and the number of gradual learnings that are performed ("Gradual-learn"). As shown, Model-1/Update-2 has the lowest false negatives (FN). The no-update strategy has the highest FN. In addition, when the template size (T-size) is 5 (indicating the number of templates in the template set stored in the template storage 208), the number of times a passcode was requested from the user by the system is 10 for Model-2/Update-1, but only 1 for the Model-1/Update-2, indicating that gradual learning, while not noticeable by the user in the sense that the user is not prompted for a passcord, significantly reduced the number of passcode requests. As shown by the results in Table 1, Model-1/Update-2 appears to be the best strategy to adapt the system to face variations of the user.

TABLE 1

| | Model-1 | | | | | | Model-2 | | | | No-Update |
|---|---|---|---|---|---|---|---|---|---|---|---|
| | Update-1 | | | Update-2 | | | Update-1 | | Update-2 | | N/A |
| T-Size | FN | Passcode | Gradual-learn | FN | Passcode | Gradual-learn | FN | Passcode | FN | Passcode | FN |
| 5 | 46 | 2 | 47 | 21 | 1 | 33 | 63 | 10 | 55 | 8 | 294 |
| 10 | 17 | 2 | 41 | 17 | 3 | 19 | 40 | 5 | 40 | 5 | 235 |
| 16 | 1 | 1 | 31 | 1 | 1 | 19 | 21 | 6 | 21 | 6 | 231 |

Figure 6:
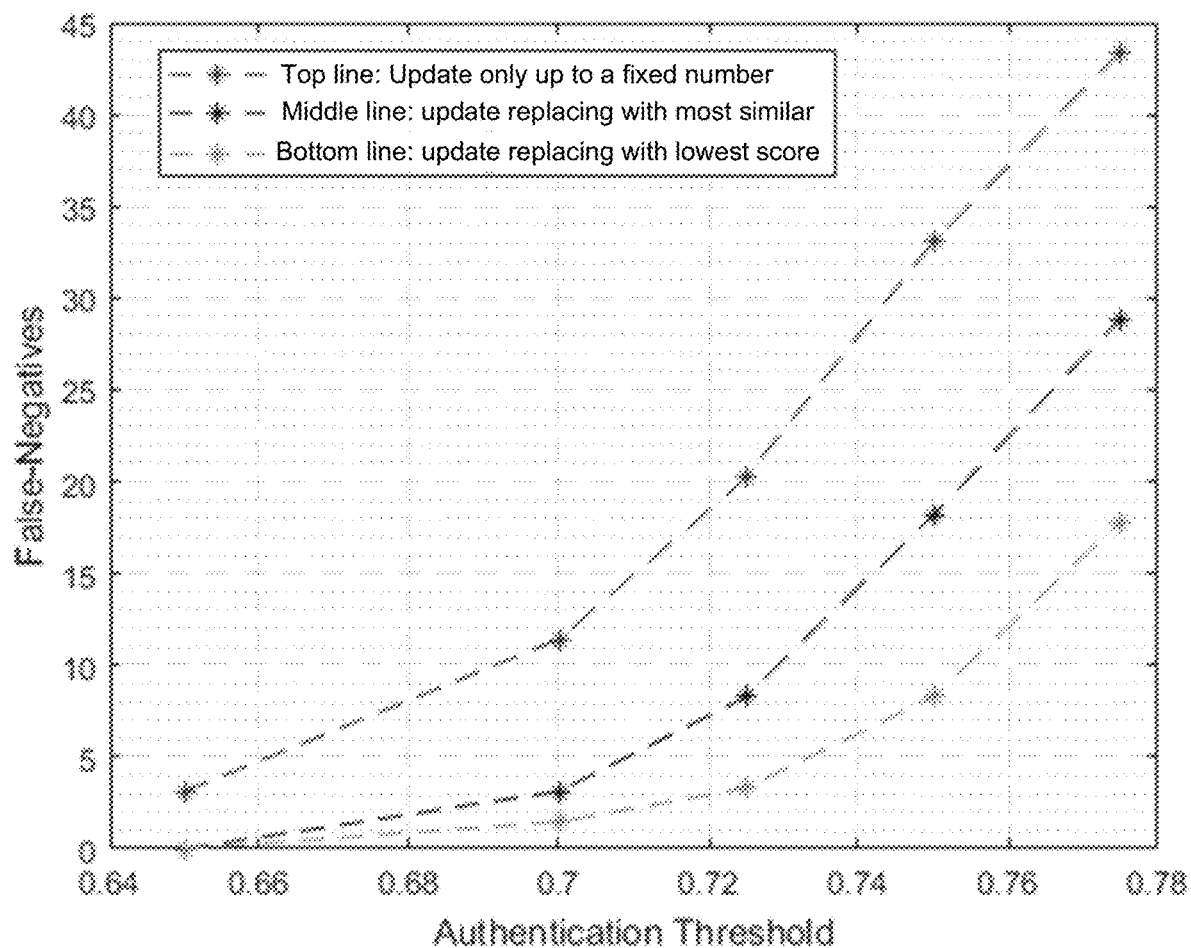
FIG. 6 is a graph illustrating the effects of an authentication threshold on a false-negative rate of different template updating strategies, in accordance with some examples.

A second experiment was conducted to test the different template updating strategies. The second experiment kept the final template from the first experiment as the reference template set while changing the authentication thresholds. FIG. 6 is a graph illustrating the effects of the authentication threshold on the false-negative rate of different template updating strategies, including an update strategy that updates only up to a fixed number (also referred to as the size of the template set) of templates (represented by the top-most dotted line), an update strategy that updates by replacing the most similar template to the new template (represented by the middle dotted line), and an update strategy that updates based on importance score (represented by the bottom-most dotted line). As shown in FIG. 6, the updating strategy based on the importance score (the bottom-most dotted line) has a lower number of false negatives (failures) as the authentication threshold is increased.

A third experiment was done to determine the effects of the different strategies (including Model-1 and Model-2 from above) using a relatively large, standard publicly available dataset called the labeled faces in the wild (LFW) dataset, which has a size of 11,890 images. The experiment was done using two different sizes of reference template sets—size 10 and size 20. The false positive rates were zero for both Model-1 and Model-2 from above. However, the average number of faces which fall in different similarity ranges differed between Model-1 and Model-2. Table 2 below demonstrates the average number of faces in different similarity ranges. Considering the template size of 20, for example, the average number of faces in the 0.5-0.6 range changed from 0.4 to 0.5 from Model-2 to Model-1. Accordingly, the effect of gradual learning (using Model-1) on the potential false positive rate is negligible.

TABLE 2

|  |  | 0-0.1 | 0.1-0.2 | 0.2-0.3 | 0.3-0.4 | 0.4-0.5 | 0.5-0.6 |
|---|---|---|---|---|---|---|---|
| T_size 20 | Model-2 | 5604.5 | 3694.2 | 835.4 | 112.6 | 10.7 | 0.4 |
|  | Model-1 | 5283.9 | 4340.6 | 1030 | 142.95 | 13.95 | 0.5 |
| T_size 10 | Model-2 | 5790 | 3402.9 | 713.15 | 96.75 | 7.2 | 0.25 |
|  | Model-1 | 5770.1 | 3681.3 | 768.85 | 102.1 | 9.7 | 0.45 |

The results of the experiments described above indicate the positive effects of the user-adaptive biometric authentication techniques (based on user adaptation, gradual learning, and/or importance-score computation) on an authentication system (e.g., a face unlocking system). The results of using Model-1/Update-2, for example, helped to reduce the number of times that the authentication system would need to update by passcode (thereby reducing the number of times the user would be prompted to enter a passcode), while false negatives were also reduced significantly. The negative effect of the adaptive, gradual learning is negligible on the relatively large LFW dataset.

Figure 7:
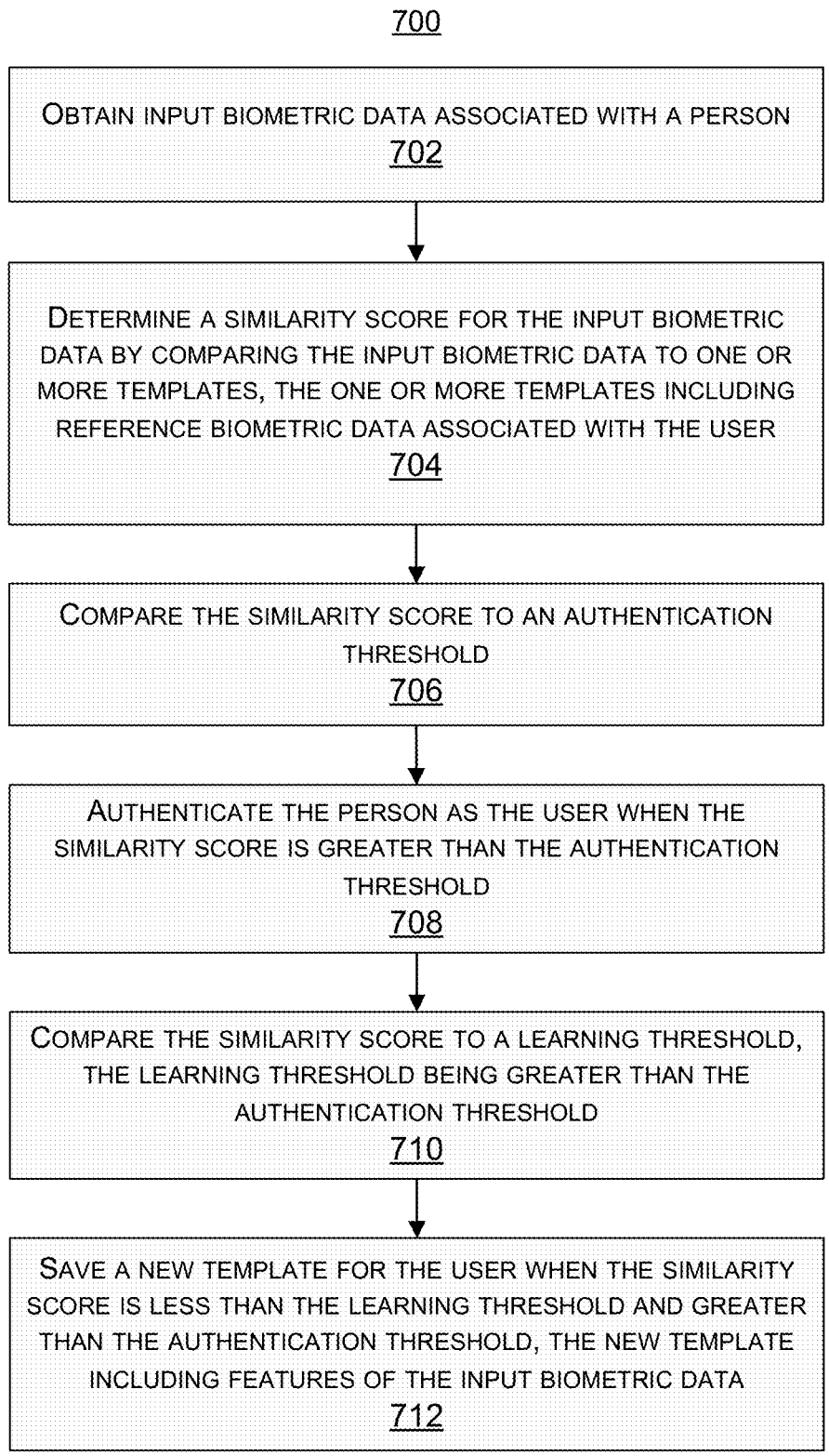
FIG. 7 is a flowchart illustrating an example of a process of authenticating a user of a computing device, in accordance with some examples.

FIG. 7 is a flowchart illustrating an example of a process 700 of authenticating a user of a computing device using the authentication techniques described herein. At block 702, the process 700 includes obtaining input biometric data associated with a person. The input biometric data can include any type of biometric data, such as face data (extracted from one or more images), fingerprint data, voice data, any combination thereof, and/or other suitable biometric data. For instance, using face data as an example, the face data can include one or more feature vectors representing a face of the person. In some examples, the process 700 can include extracting one or more local features of the face, and generating the one or more feature vectors representing the face using the extracted one or more local features. Any suitable feature extraction technique can be used, such as those described above.

At block 704, the process 700 includes determining a similarity score for the input biometric data. The similarity score can be determined by comparing the input biometric data to one or more templates. As described above, the one or more templates include reference biometric data associated with the user.

At block 706, the process 700 includes comparing the similarity score to an authentication threshold. At block 708, the process 700 includes authenticating the user as the person when the similarity score is greater than the authentication threshold. In some cases, the process 700 can include unlocking the computing device in response to authenticating the user as the person. For example, referring to FIG. 4, in response to determining the score is greater than the authentication threshold (block 410), the device can be unlocked (block 412).

At block 710, the process 700 includes comparing the similarity score to a learning threshold. The learning threshold is greater than the authentication threshold. The learning threshold can also be referred to as a gradual learning threshold. At block 712, the process 700 includes saving a new template for the user when the similarity score is less than the learning threshold and greater than the authentication threshold. For example, referring to FIG. 4, in response to determining the score is less than the learning threshold (block 414) and greater than the authentication threshold, a new template can be saved (block 416). The new template includes features of the input biometric data.

In some examples, the process 700 can include determining an importance score for each template of the one or more templates (not shown in FIG. 7). In some cases, the process 700 can include removing a template with a lowest importance score from storage when memory usage of the computing device exceeds a usage threshold (now shown in FIG. 7).

In some cases, an importance score is determined for a template of the one or more templates based on a minimum distance of the template from other templates of the one or more templates. For instance, the importance score can be computed using equation (1) discussed above. In some cases, an importance score is determined for a template of the one or more templates based on an average of at least two minimum distances of the template from other templates of the one or more templates. For instance, the importance score can be computed using equation (3) discussed above. In some cases, an importance score is determined for a template of the one or more templates based on a density of the template. For instance, the importance score can be computed using equations (4) and (5) discussed above. As described above, the density is associated with an average similarity that the template has with other templates of the one or more templates.

In some examples, the process 700 can include comparing the similarity score to a passcode threshold (not shown in FIG. 7). The passcode threshold is less than the authentication threshold. In some examples, the process 700 can further include requesting a passcode when the similarity score is less than the authentication threshold and greater than the passcode threshold (not shown in FIG. 7). In such examples, the process 700 can further include determining whether a received passcode is a correct passcode, and saving a new template for the user when the correct passcode is received (not shown in FIG. 7). Alternatively, in some examples, when the similarity score is less than the authentication threshold and less than the passcode threshold, the process 700 can further include maintaining the computing device in a locked state (not shown in FIG. 7).

In some examples, the process 700 may be performed by a computing device or an apparatus, which can include the adaptive authentication system 200 shown in FIG. 2. In some cases, the computing device or apparatus may include a processor, microprocessor, microcomputer, or other component of a device that is configured to carry out the steps of process 700. In some examples, the computing device or apparatus may include one or more sensors or other input devices configured to capture biometric data (e.g., a camera configured to capture images and/or video data including video frames, a fingerprint sensor or scanner configured to capture fingerprint data, a microphone configured to capture voice data, a combination thereof, or any other suitable sensor that can capture biometric data). For example, the computing device may include a mobile device with one or more sensors (e.g., a camera, a fingerprint sensor, a microphone, a combination thereof, or any other suitable sensor that can capture biometric data). In some cases, the computing device may include a display for displaying one or more images or other information. In some cases, the computing device may include a video codec. In some examples, the one or more sensors that capture biometric data are separate from the computing device, in which case the computing device receives the captured biometric data. The computing device may further include a network interface configured to communicate data. The network interface may be configured to communicate Internet Protocol (IP) based data or other suitable network data.

Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
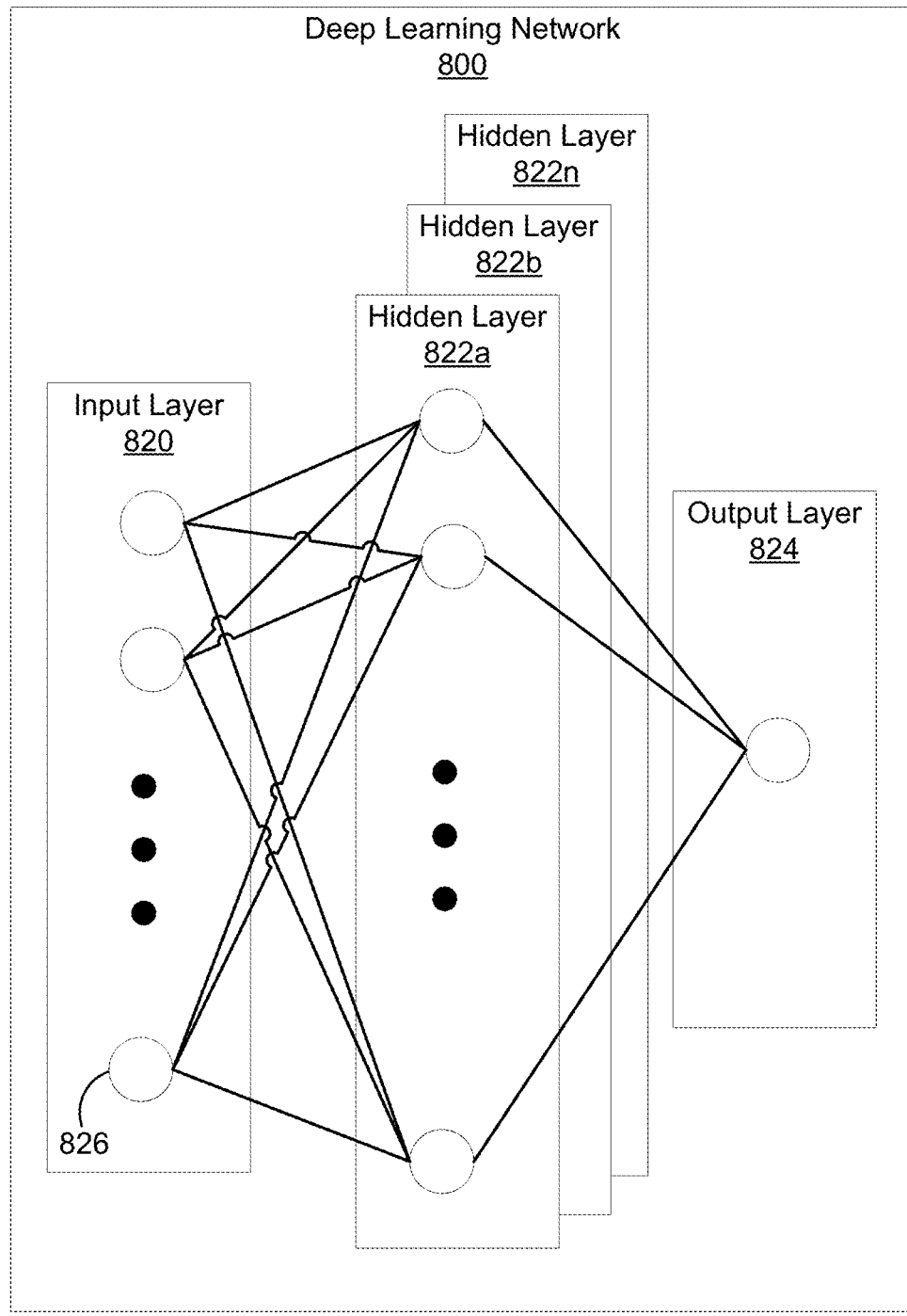
FIG. 8 is a diagram illustrating an example of a deep learning network, in accordance with some examples.

As described above, a neural network can be used by the feature extraction engine 204 to perform feature extraction. FIG. 8 is a diagram showing an illustrative example of a deep learning neural network 800 that can be used by the feature extraction engine 204. An input layer 820 includes input data. In one illustrative example, the input layer 820 can include data representing the pixels of an input image. The deep learning network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The deep learning network 800 further includes an output layer 824 that provides an output resulting from the processing performed by the hidden layers 822a, 822b, through 822n. In one illustrative example, the output layer 824 can provide a classification for a feature or a group of features in an input image. For instance, the classification can include a class for each feature.

The deep learning network 800 is a multi-layer neural network of interconnected nodes. Each node can represent a piece of information. Information associated with the nodes is shared among the different layers and each layer retains information as information is processed. In some cases, the deep learning network 800 can include a feed-forward network, in which case there are no feedback connections where outputs of the network are fed back into itself. In some cases, the network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the hidden layers 822a-n can transform the information of each input node by applying activation functions to this information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the deep learning network 800 are shown as having multiple output lines, a node has a single output and all lines shown as being output from a node represent the same output value.

In some cases, each node or interconnection between nodes can have a weight that is a set of parameters derived from the training of the deep learning network 800. For example, an interconnection between nodes can represent a piece of information learned about the interconnected nodes. The interconnection can have a tunable numeric weight that can be tuned (e.g., based on a training dataset), allowing the deep learning network 800 to be adaptive to inputs and able to learn as more and more data is processed.

The deep learning network 800 is pre-trained to process the features from the data in the input layer 820 using the different hidden layers 822a, 822b, through 822n in order to provide the output through the output layer 824. In an example in which the deep learning network 800 is used to identify features in images, the network 800 can be trained using training data that includes both images and labels for different features. For instance, training images can be input into the network, with each training image having a label indicating the classes of the one or more features in each image (basically, indicating to the network what the features are and what characteristics they have). In one illustrative example, a training image can include an image of a number 2, in which case the label for the image can be [0 0 1 0 0 0 0 0 0 0].

In some cases, the deep learning network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 800 is trained well enough so that the weights of the layers are accurately tuned.

For the example of identifying features in images, the forward pass can include passing a training image through the network 800. The weights are initially randomized before the deep learning network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 800, the output will likely include values that do not give preference to any particular class due to the weights being randomly selected at initialization. For example, if the output is a vector with probabilities that the feature includes different classes, the probability value for each of the different classes may be equal or at least very similar (e.g., for ten possible classes, each class may have a probability value of 0.1). With the initial weights, the network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 800 can include any other deep network other than a CNN, such as an autoencoder, a deep belief nets (DBNs), a Recurrent Neural Networks (RNNs), among others.

Figure 9:
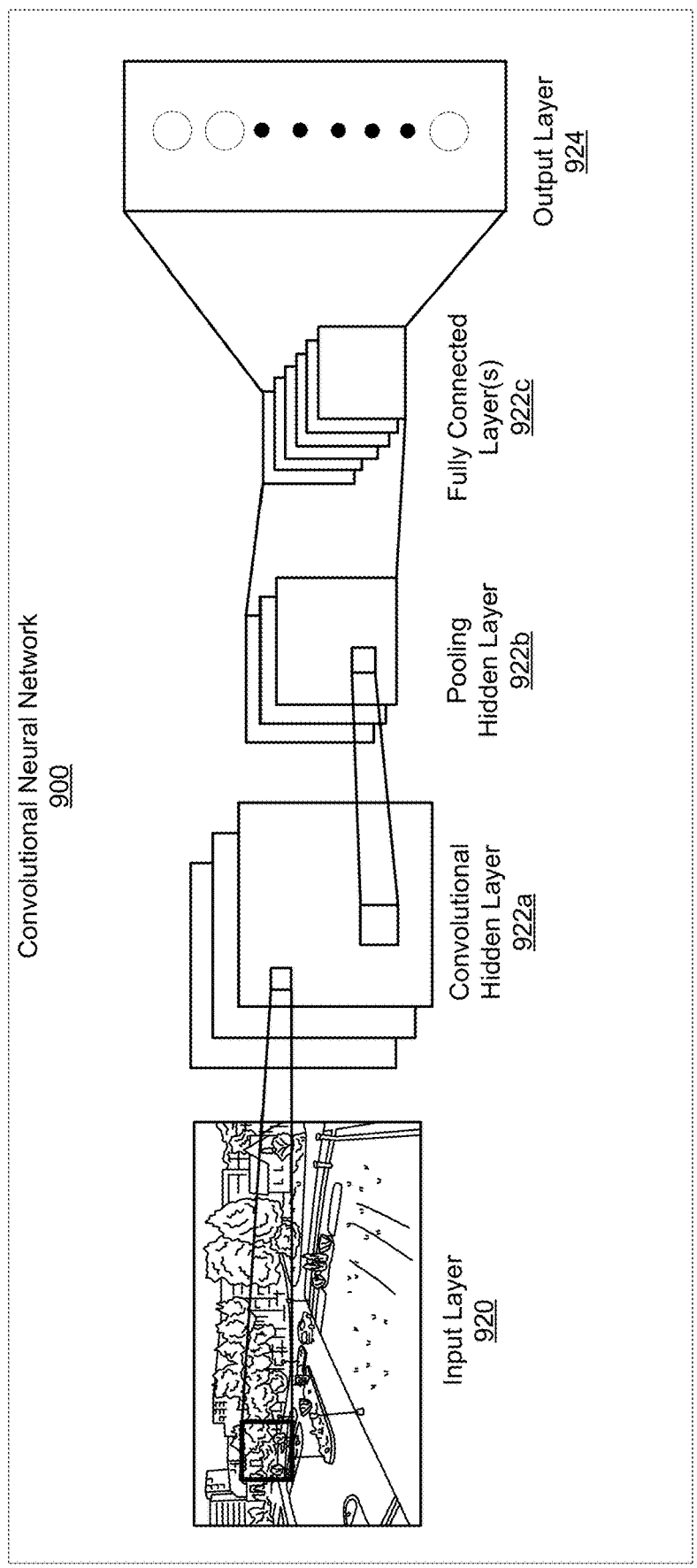
FIG. 9 is a diagram illustrating an example of a convolutional neural network, in accordance with some examples.

FIG. 9 is an illustrative example of a convolutional neural network 900 (CNN 900). The input layer 920 of the CNN 900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a class for each detected feature or can include a probability of classes that best describe the features in the image.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters or kernels (each filter or kernel corresponding to a different activation or feature map), with each convolutional iteration of a filter or kernel being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image, such as red, green, and blue color components). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions can be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

After the convolutional layers, there may be any number of fully-connected layers. A fully-connected layer connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict a certain feature of a face, high values will be present in the activation maps that represent high-level features of faces (e.g., eyes, eye positions, distance between eyes, the nose, the mouth, the 3D structure of the face, and/or other features common for a face).

In some examples, the output from the output layer 924 can include an M-dimensional vector (in the prior example, M=10), where M can include the number of classes that the program has to choose from when classifying the features in the image. Other example outputs can also be provided. Each number in the N-dimensional vector can represent the probability the feature is of a certain class. In one illustrative example, if a 10-dimensional output vector represents ten different classes of objects is [0 0 0.05 0.8 0 0.15 0 0 0 0], the vector indicates that there is a 5% probability that the face has a third class of feature (e.g., a dog), an 80% probability that the face has a fourth class of feature (e.g., a human), and a 15% probability that the face has a sixth class of feature (e.g., a kangaroo). The probability for a class can be considered a confidence level that the object is part of that class.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of authenticating a user of a device, the method comprising:
   obtaining input biometric data associated with a person;
   determining a similarity score for the input biometric data by comparing the input biometric data to one or more templates, the one or more templates including reference biometric data associated with the user;
   comparing the similarity score to an authentication threshold;
   authenticating the person as the user when the similarity score is greater than the authentication threshold;
   comparing the similarity score to a learning threshold, the learning threshold being greater than the authentication threshold; and
   saving a new template for the user when the similarity score is less than the learning threshold and greater than the authentication threshold, the new template including features of the input biometric data.

2. The method of claim 1, further comprising determining one or more importance scores for the one or more templates.

3. The method of claim 2, wherein an importance score is determined for a template of the one or more templates based on a minimum distance of the template from other templates of the one or more templates.

4. The method of claim 2, wherein the importance score is determined for a template of the one or more templates based on an average of at least two minimum distances of the template from other templates of the one or more templates.

5. The method of claim 2, wherein an importance score is determined for a template of the one or more templates based on a density of the template, the density being associated with an average similarity that the template has with other templates of the one or more templates.

6. The method of claim 2, further comprising removing a template with a lowest importance score from storage when memory usage of the device exceeds a usage threshold.

7. The method of claim 1, further comprising:
comparing the similarity score to a passcode threshold, the passcode threshold being less than the authentication threshold;
requesting a passcode when the similarity score is less than the authentication threshold and greater than the passcode threshold;
receiving a passcode;
determining whether the received passcode is a correct passcode; and
saving a new template for the user when the correct passcode is received.

8. The method of claim 1, further comprising:
comparing the similarity score to a passcode threshold, the passcode threshold being less than the authentication threshold; and
maintaining the device in a locked state when the similarity score is less than the authentication threshold and less than the passcode threshold.

9. The method of claim 1, further comprising unlocking the device in response to authenticating the person as the user.

10. The method of claim 1, wherein the input biometric data includes face data.

11. The method of claim 10, wherein the face data includes one or more feature vectors representing a face of the person.

12. The method of claim 11, further comprising:
extracting one or more features of the face; and
generating the one or more feature vectors representing the face using the extracted one or more features.

13. The method of claim 1, wherein the input biometric data includes fingerprint data.

14. An apparatus for authenticating a user, comprising:
a memory configured to store one or more templates; and
a processor configured to:
obtain input biometric data associated with a person;
determine a similarity score for the input biometric data by comparing the input biometric data to one or more templates, the one or more templates including reference biometric data associated with the user;
compare the similarity score to an authentication threshold;
authenticate the person as the user when the similarity score is greater than the authentication threshold;
compare the similarity score to a learning threshold, the learning threshold being greater than the authentication threshold; and
save a new template for the user when the similarity score is less than the learning threshold and greater than the authentication threshold, the new template including features of the input biometric data.

15. The apparatus of claim 14, wherein the processor is further configured to determine one or more importance scores for the one or more templates.

16. The apparatus of claim 15, wherein an importance score is determined for a template of the one or more templates based on a minimum distance of the template from other templates of the one or more templates.

17. The apparatus of claim 15, wherein an importance score is determined for a template of the one or more templates based on an average of at least two minimum distances of the template from other templates of the one or more templates.

18. The apparatus of claim 15, wherein an importance score is determined for a template of the one or more templates based on a density of the template, the density being associated with an average similarity that the template has with other templates of the one or more templates.

19. The apparatus of claim 15, wherein the processor is further configured to remove a template with a lowest importance score from storage when memory usage of the apparatus exceeds a usage threshold.

20. The apparatus of claim 14, wherein the processor is further configured to:
compare the similarity score to a passcode threshold, the passcode threshold being less than the authentication threshold;
request a passcode when the similarity score is less than the authentication threshold and greater than the passcode threshold;
receiving a passcode;
determine whether the received passcode is a correct passcode; and
save a new template for the user when the correct passcode is received.

21. The apparatus of claim 14, wherein the processor is further configured to:
compare the similarity score to a passcode threshold, the passcode threshold being less than the authentication threshold; and
maintain the apparatus in a locked state when the similarity score is less than the authentication threshold and less than the passcode threshold.

22. The apparatus of claim 14, wherein the processor is further configured to unlock the apparatus in response to authenticating the person as the user.

23. The apparatus of claim 14, wherein the input biometric data includes face data.

24. The apparatus of claim 23, wherein the face data includes one or more feature vectors representing a face of the person.

25. The apparatus of claim 24, wherein the processor is further configured to:
extract one or more features of the face; and
generate the one or more feature vectors representing the face using the extracted one or more features.

26. The apparatus of claim 14, wherein the input biometric data includes fingerprint data.

27. The apparatus of claim 14, wherein the apparatus comprises a mobile device.

28. The apparatus of claim 27, further comprising an input device for obtaining the biometric input data.

29. The apparatus of claim 28, wherein the input device includes at least one or more of a camera, a fingerprint scanner, and a microphone.

30. A non-transitory computer-readable medium having stored thereon instructions that, when executed by one or more processors, cause the one or more processor to:
obtain input biometric data associated with a person;
determine a similarity score for the input biometric data by comparing the input biometric data to one or more templates, the one or more templates including reference biometric data associated with the user;
compare the similarity score to an authentication threshold;
authenticate the person as the user when the similarity score is greater than the authentication threshold;
compare the similarity score to a learning threshold, the learning threshold being greater than the authentication threshold; and save a new template for the user when the similarity score is less than the learning threshold and greater than the authentication threshold, the new template including features of the input biometric data.

\* \* \* \* \*